April 28, 1953  W. HOLDEN  2,636,361

HOLDER FOR SCREW-THREADING TAPS, REAMERS, AND LIKE TOOLS

Filed Aug. 8, 1950

Inventor
William Holden
By Bailey, Stephens & Huettig
Attorneys

UNITED STATES PATENT OFFICE 2,636,361

HOLDER FOR SCREW-THREADING TAPS, REAMERS, AND LIKE TOOLS

William Holden, Petts Wood, Orpington, England

Application August 8, 1950, Serial No. 178,320
In Great Britain August 31, 1949

1 Claim. (Cl. 64—11)

When a screw-threading tap, reamer or other rotary tool mounted in a holder on a machine is used in a hole previously drilled in a work piece, it is sometimes found that the tool does not enter the hole in a perfectly true axial direction, and the object of the present invention is to provide an improved form of tool holder by means of which that drawback may be overcome.

For that purpose, and according to the present invention, a holder for a tap, reamer, or other rotary tool is formed in two parts, one of which is to be received in, and driven by, a machine, and the other of which is formed with a socket to receive the tool and is not arranged for lateral support by a bearing, the adjacent ends of said parts being spaced from one another endwise and united by a universally flexible joint consisting of a mass of oil-resisting rubber or similar resilient material.

Preferably the adjacent ends of the two parts of the tool holder are embedded in the mass of resilient material and they may be formed with lateral projections to ensure adequate driving connection between said parts and the mass of resilient material. For example, each of said parts may have two cross-pins passing therethrough at right-angles to one another and projecting laterally therefrom.

After these two parts have been located in axial alignment with a small space therebetween a substantially spherical mass of oil-resisting rubber or other resilient material may be moulded therearound so that the pins are embedded therein and so that the resilient material fills the space between the ends of the parts.

Alternatively the adjacent ends of the two parts may be formed with deep splines, in which event the mass of resilient material may be moulded therearound as mentioned above or may be moulded separately with recesses complementary to the splined parts, said recesses being separated by a central diaphragm corresponding in thickness with the desired spacing between the adjacent ends of the two parts of the tool holder.

One embodiment of the invention will be described with reference to the accompanying drawings, in which.

Figure 1:
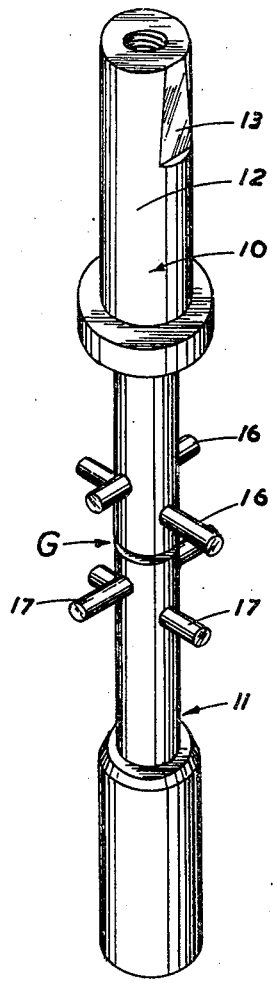
Figure 1 is a perspective view of two parts of a tool-holder.

Referring to the drawings, the upper and lower parts 10 and 11 respectively of the tool-holder comprise machined steel bar, the upper end of the upper part 10 being formed with a shank 12 having a flat 13, or alternatively a morse taper or splined or straight end according to requirements. The lower part 11 is formed at its lower end with a socket 14 arranged to suit the shank of the tool to be used, and preferably provided with an Allen screw 15 or other suitable means to grip the tool. Alternatively the lower end of the part 11 may be provided with means such as a collet chuck.

The adjacent ends of the parts 10 and 11 are spaced apart endwise by a gap G of the order of $\frac{1}{16}$–$\frac{3}{16}$ of an inch, and are provided with steel cross-pins 16, 17, which are immovably secured in the respective parts.

During manufacture, the assembly as shown in Figure 1 is located so as to provide the requisite gap G, and a ball 18 of neoprene is then moulded around the parts while they are held so located.

Figure 2:
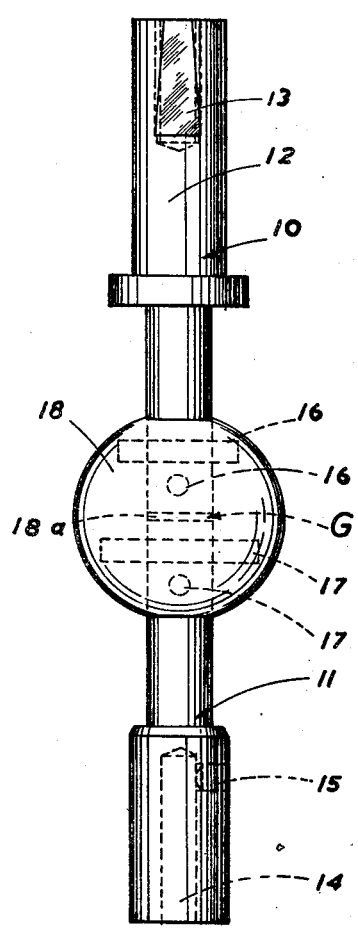
Figure 2 is a side elevation of the tool-holder, showing the parts embedded in a resilient ball.

This ball 18 is shown in Figure 2 in the position which it eventually occupies. The moulding process ensures not only that the cross-pins 16, 17 are embedded in the resilient ball 18, but that the gap G is filled by a diaphragm 18a which forms an integral part of the ball 18.

The hardness of the ball 18 may be selected for the eventual work to be performed by the tool. Thus, for tapping a ¼ in. B. S. F. hole in ¼ in. thick dural or malleable iron, a Shore hardness as low as 30 is permissible, while for tapping a ⅜ in. B. S. F. hole, a Shore hardness of 60 is desirable, and for a ½ in. B. S. F. hole a Shore hardness of 75 is preferred. Taps should preferably be slightly pointed, especially with a low Shore hardness, so as to ensure centring.

As an example, the ball 18 may be 1⅝ in. in diameter, when used with cross-pins ⅛ in. in diameter and projecting about $\frac{5}{16}$ in. on each side of the parts 10 and 11. It will be appreciated, however, that all dimensions and Shore hardness are dependent on the type of work to be undertaken.

In an alternative embodiment, instead of the cross-pins 16, 17, deep splines are formed on the adjacent ends of the parts 10 and 11. The resilient ball 18 is correspondingly moulded to engage the splines, and is formed with a central diaphragm similar to the diaphragm 18a to fill the gap G. Such a ball may be separately moulded, and may be detached from the splined parts if a replacement is required.

In either embodiment, as the mass of resilient material is flexible, it follows that the tool will be able to adapt itself to the direction of the hole into which it is introduced, even though the axes of the two parts of the holder are not in absolute alignment, due, for example, to slight wear of the part of the machine in which the holder is fitted, or of the bearings in which said part is mounted.

It is to be understood that the invention is intended for use where play tending to set up misalignment of the tool in the hole is of the order of one to ten thousandths of an inch, and it is in relation to such deflection that the resilient mass is said to be universally flexible. Moreover it is to be understood that the driving torque is not such as would tend to cause the mass of resilient material to be torn.

The use of the invention is not restricted to tools having a combined rotary and advancing motion but is applicable also to tools which have a purely advancing motion in use relatively to the work, such as tools mounted on a capstan lathe or needle used in mattress making machinery.

It is further to be understood that as the tools and loadings encountered vary within a wide range, so the dimensions and design of the toolholder may be correspondingly varied. For example, where the torque is low, instead of having cross-pins or splines, the adjacent ends of the parts 10 and 11 may be knurled.

I claim:

A holder for a tool such as a tap comprising a shank for rotation in rigidly mounted bearings, a socketed part serving to receive the tool, and a substantially spherical mass of resilient material embracing the adjacent ends of said shank and socketed part and formed with a transverse diaphragm extending between and serving to space apart said adjacent ends, said ends substantially engaging opposite sides of said diaphragm, said spherical mass and adjacent ends being formed with complementary interengaging means providing a driving connection between said adjacent ends and preventing movement of said ends away from each other, said interengaging means comprising two cross-pins on each of the shank and socketed parts disposed at right angles to each other and projecting laterally into and engaging with the resilient mass.

WILLIAM HOLDEN.

References Cited in the file of this patent

UNITED STATES PATENTS

| Number | Name | Date |
|---|---|---|
| 1,310,845 | Simms | July 22, 1919 |
| 1,883,203 | Whitehouse | Oct. 18, 1932 |
| 2,295,316 | Yates | Sept. 8, 1942 |
| 2,297,619 | Haberstump | Sept. 29, 1942 |
| 2,368,888 | Schumann | Feb. 6, 1945 |
| 2,409,385 | Pletcher | Oct. 15, 1946 |